Feb. 1, 1927.   
W. A. HATCHER   
1,616,188

VACUUM CLAMPING FIXTURE FOR WHEEL RIMS

Filed Nov. 12, 1924

Inventor  
William Albert Hatcher

Patented Feb. 1, 1927.

1,616,188

UNITED STATES PATENT OFFICE.

WILLIAM ALBERT HATCHER, OF DETROIT, MICHIGAN, ASSIGNOR TO CRESCENT PUMP COMPANY, OF DETROIT, MICHIGAN, A CORPORATION OF MICHIGAN.

VACUUM CLAMPING FIXTURE FOR WHEEL RIMS.

Application filed November 12, 1924. Serial No. 749,554.

The invention relates to a vacuum clamping fixture for supporting a demountable rim and rigidly holding the same.

In the manufacture of demountable rims for automobile wheels, the usual process often results in the formation of burrs on the surface of the same which must be removed in some suitable manner. The usual practice is to clamp the rim in the ordinary bench vise and the workman goes over the rough surface with a pneumatic chisel. The ordinary vise, however, is not particularly adapted for this work since it requires considerable time merely for the clamping and unclamping of the rim and the work is not as securely held as is desirable.

According to the present invention a fixture has been devised having a segmental surface conforming substantially to the contour of the rim and the fixture is provided with means for evacuating the air upon one side of the rim thereby effectively clamping the rim against a rigid abutment.

The primary object of the invention is to provide a fixture of simple design which is adapted to rigidly support the rim and which can be clamped and unclamped with a minimum loss of time.

Other objects of the invention reside in the details of construction hereinafter fully described and illustrated in the accompanying drawings wherein.

Figure 1:
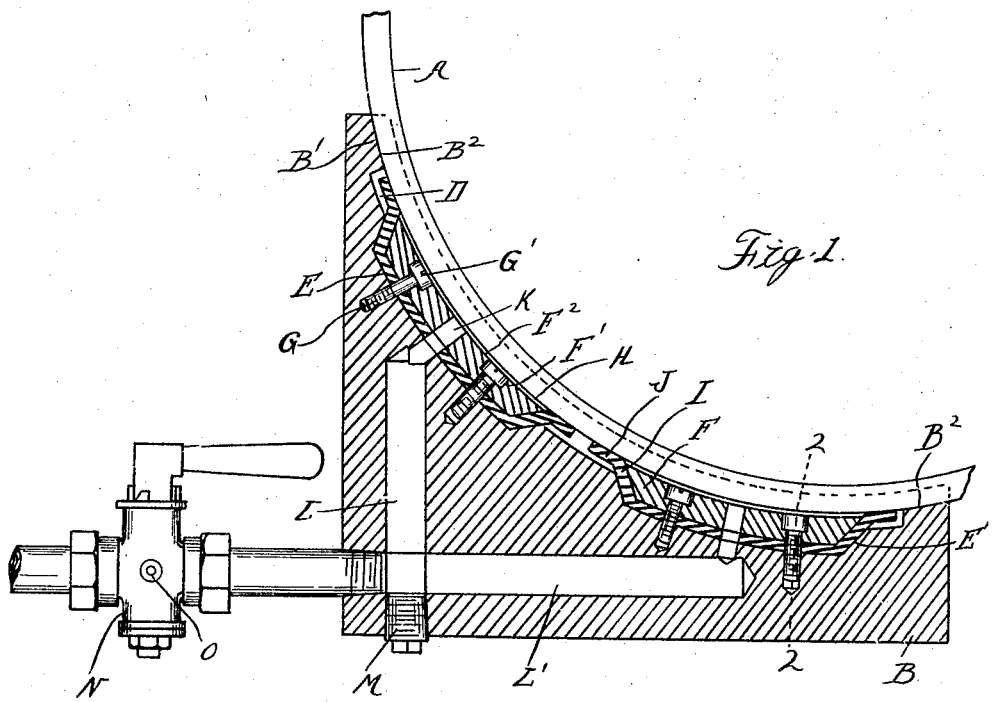
Figure 1 is a longitudinal section through the clamping device.
Figure 2:
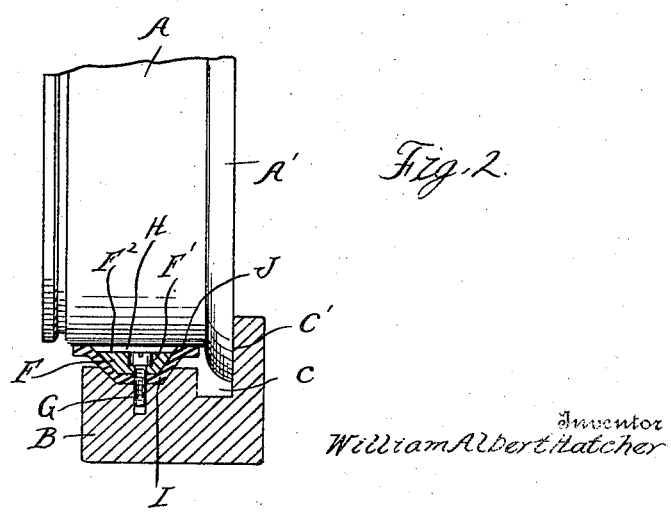
Figure 2 is a transverse section on the line 2—2 of Figure 1.

A represents a demountable rim of the straight side type having at one side the projecting annular flange A'.

The fixture for supporting the rim A comprises a metallic block B having a segmental surface B' on the same, the end portions $B^2$ of which are of the same radius of curvature as the outer surface of the rim A and form abutments for receiving said rim. C is an annular recess for receiving the flange A' of the rim and has the upstanding shoulder portion C' for positioning and bracing the rim in the fixture. Intermediate the abutments $B^2$ there is a recess D and there are also the deeper recesses or depressions E, the sides E' of which are arranged at an angle to the surface of the rim. Inserted in the depressions E are the clamping members F formed complementary to the depressions E and secured to the block B by the screws or bolts G. The heads G' of the bolts are arranged in countersinks F' so that the heads are substantially flush with the outer surfaces $F^2$ of the clamping members, these latter surfaces being preferably segmental and spaced slightly from the surface of the rim to form a vacuum space H therebetween. I represents a sheet of gum rubber or other resilient material which is inserted in the depression E beneath the clamping member F, the sheet being deformed by these members to form in effect a vacuum cup having the marginal portions J engaging the surface of the rim.

In order to evacuate the air in the vacuum space H the clamping member F is provided with an aperture K leading to the vacuum passageways L and L' in the block B, the latter preferably being formed by intersecting drilled holes extending adjacent the depressions D in the block. One of the bores is preferably plugged as illustrated at M while the other bore communicates with a suitable source of vacuum through the control valve N.

With the apparatus as above described, the valve N is closed when the work is to be inserted thus venting the passageways L and L' to the atmosphere through the passage O and the rim is then placed in the fixture to bear against the abutments $B^2$, the flange A bearing against the shoulder C'. By turning the valve N vacuum is communicated to the vacuum space H thereby causing the rim to be firmly held to the fixture by the differential pressure acting radially on the rim. The sheet rubber I forms an effective seal with the rim to prevent leakage of air and a high pressure is therefore maintained upon the rim holding the same in the fixture.

In using the fixture it may be clamped if desired in the ordinary bench vise, but it is not necessary to remove the same from the vise upon changing rims in the fixture, but it is only necessary to turn the valve N to release the vacuum in order to quickly replace a finished rim with the next one of the lot.

What I claim as my invention is:—

1. A fixture for clamping rims and the like comprising a block provided with a segmental-shaped surface for receiving a portion of the rim, a passageway in said block adapted to be connected to a source of vacuum, and a suction cup connected with said passageway and arranged to project from said segmental-shaped surface, said cup having marginal portions adapted to conform to the curved surface of said rim to form a sealing contact therewith.

2. A fixture for clamping rims and the like comprising a block having a surface shaped to conform to the peripheral contour of a rim, abutments on said block for rigidly supporting the rim, a vacuum passageway within said block, and a vacuum cup having marginal portions adapted to conform to the peripheral surface of the rim, said vacuum cup being arranged in said block between said abutments and being connected to said vacuum passageway.

3. A fixture for clamping rims and the like comprising a block shaped to conform substantially to the peripheral contour of a rim, abutments on said block for rigidly supporting said rim, the block being provided with a segmental recess intermediate said abutment adjacent the band of the rim, and a deeper segmental recess for receiving the flange thereof, said first-mentioned recess having a cavity with sloping sides, a complementary clamping member inserted in said cavity and spaced from said rim to form a vacuum space, a sheet of flexible material secured by said clamping member, said sheet having the marginal portions thereof engaging the rim, and a vacuum passageway in the block communicating with said vacuum space.

4. A vacuum clamping fixture for demountable rims comprising a block shaped to conform substantially to the peripheral contour of a rim, abutments on said block for rigidly supporting said rim, said block being provided with a segmental recess intermediate said abutments and a deeper segmental recess for the flange of said rim, said first-mentioned recess having a cavity therein with sloping sides, a sheet of rubber inserted in said cavity, a clamping member also inserted in said cavity over said sheet and securel to said block, said clamping member being spaced from said rim and being provided with an aperture, and a vacuum passageway in said block connecting with said aperture.

5. A vacuum clamping fixture for demountable rims comprising a body having a segmental-shaped surface adapted to form a seat for the rim and provided with a segmental recess spaced from said rim, said recess having a pair of depressions therein, a complementary clamping member inserted in each of said depressions, clamping screws connecting said members to said body, a sheet of gum rubber clamped in each of said depressions by said clamping member, said fixture having a vacuum passageway through said body communicating with the surface of said rim through said clamping member.

6. A fixture for clamping rims and the like comprising a block provided with a surface shaped to conform to the peripheral contour of a rim, a vacuum passageway in said block, a clamping member secured to said block and a sheet of flexible material secured by said clamping member and adapted to be deformed thereby into a cup having marginal portions contacting with the periphery of said rim.

In testimony whereof I affix my signature.

WILLIAM ALBERT HATCHER.